United States Patent [19]

Murray et al.

[11] Patent Number: 4,854,784
[45] Date of Patent: Aug. 8, 1989

[54] DIAMOND TIPPED CHIP CONTROL INSERT

[75] Inventors: Gerald D. Murray, Raleigh, N.C.; Shelby R. Gibson; Keith J. Carpenter; Kenneth E. Carpenter; Michael R. Carpenter, all of Liberty Center, Ohio

[73] Assignee: Kennametal Inc., Latrobe, Pa.

[21] Appl. No.: 259,690

[22] Filed: Oct. 19, 1988

[51] Int. Cl.⁴ .................. B23B 27/20; B23B 27/22
[52] U.S. Cl. .................... 407/114; 407/116; 407/119
[58] Field of Search ............ 407/113, 114, 115, 116, 407/118, 119

[56] References Cited

U.S. PATENT DOCUMENTS

| | | | |
|---|---|---|---|
| 3,868,750 | 3/1975 | Ellis et al. | 407/119 |
| 4,201,501 | 5/1980 | Day | 407/119 |
| 4,561,810 | 12/1985 | Ohno | 407/118 |
| 4,714,385 | 12/1987 | Komanduri | 407/119 |

FOREIGN PATENT DOCUMENTS

| | | | |
|---|---|---|---|
| 0044293 | 4/1979 | Japan | 407/119 |
| 8202161 | 7/1982 | PCT Int'l Appl. | 407/119 |

OTHER PUBLICATIONS

"Advanced Cutting Tool Materials", Kennametal Inc., Pub. May 17, 1988, pp. 77-90.

Primary Examiner—Frederick R. Schmidt
Assistant Examiner—William E. Terrell
Attorney, Agent, or Firm—Thomas R. Trempus

[57] ABSTRACT

An improved metalcutting insert which incorporates a polycrystalline diamond or a polycrystalline cubic boron nitride material therein as a cutting edge material. The insert substrate includes integral chip control features which eliminate the need for the use of separately attached mechanical chipbreakers.

9 Claims, 2 Drawing Sheets 4,854,784

DIAMOND TIPPED CHIP CONTROL INSERT

FIELD OF THE INVENTION

The invention relates generally to metalcutting inserts and, more particularly, is directed to a metalcutting insert incorporating integral chip control features in combination with an improved wear resistant cutting edge consisting of an advanced metalcutting material.

BACKGROUND OF THE INVENTION

It is a continuing goal in the metalcutting industry to provide metalcutting inserts with sharp cutting edges that stay sharp longer, even when machining nonferrous and abrasive materials. To this end, it has been know to incorporate polycrystalline diamond materials and polycrystalline cubic boron nitride (CBN) materials on a carbide substrate to provide an improved cutting edge. One example of such an insert is the polycrystalline diamond positive insert provided by Kennametal Inc., the assignee of the present invention. Considering the TPG style positive insert (a triangularly shaped metalcutting insert) as an exemplar, the polycrystalline material is bonded onto one edge thereof so as to maintain the integrity of the original dimensions of the insert. This insert, in turn, can then be properly mounted in a toolholder.

Heretofore, in such inserts incorporating advanced metalcutting materials, all chipbreaking capabilities had to be provided to the insert and toolholder through the use of a mechanical device. Such mechanical devices typically include a metal ramp or clamp element which are used at least in part to fixedly secure the cutting insert onto a toolholder. Problems with accurate placement of the mechanical devices could tend to limit or to diminish the effectiveness of these types of chipbreaking devices.

It is an object of the present invention to provide an improved metalcutting insert which utilizes a polycrystalline diamond material or a polycrystalline cubic boron nitride (CBN) material in combination with a metalcutting insert substrate, which substrate incorporates therein integral chipbreaking features.

It is yet another object of this invention to provide an improved cutting tool with a sharp cutting edge that stays sharp longer for use in metalcutting operations.

SUMMARY OF THE INVENTION

The invention provides an improved metalcutting insert comprising a substrate into which is mounted an advanced, wear resistant material such as a polycrystalline diamond cutting edge or a polycrystalline cubic boron nitride (CBN) cutting edge. The substrate has a forward end, an upper surface and a bottom surface. In certain styles of inserts, the upper surface can be generally parallel with the bottom surface of the substrate. But in other embodiments or styles of inserts, the elevation of the upper surface relative to the bottom surface varies so as to define the rake face of the insert. Means defining a substantially continuous side wall extend between the upper and bottom surfaces. The upper surface further includes a first portion, a second portion, and a third portion. The first portion is at a predetermined first elevation relative to the bottom surface of the substrate and defines a rake face. The second portion is disposed at a second predetermined elevation relative to the bottom surface which elevation is less than the first elevation. The second portion defines a floor onto which the cutting material is mounted. The third portion of the upper surface of the substrate defines integral chipbreaking means disposed at a third elevation relative to the bottom surface of the substrate. The third elevation typically is greater than the first elevation. In combination, the first, second and third portions of the upper surface form a means defining a slot. This slot extends rearwardly from the forward end of the substrate so that at least a portion of the integral chipbreaking means extends over the slot means. Additionally, the slot is formed so as to have a floor (the second portion) which is generally parallel with the first portion rake face. Thus, the advanced metalcutting material defines the cutting edge and a rake face of the insert. The advanced metalcutting material is mounted and brazed in the slot such that at least a portion of the integral chipbreaking means extends thereover. Neither the geometry of the chipbreaking means nor the rake face of the insert are adversely effected by the incorporation of the advanced metalcutting material. With the improved insert of this invention, metalcutting capabilities are enhanced through the use of the advanced material and a consistent, integral chipbreaking capability is ensured while power consumption is conserved through the geometry of the rake face.

BRIEF DESCRIPTION OF THE DRAWINGS

The above, as well as other features and advantages of the present invention, will become readily apparent through consideration of the detailed description of the invention in conjunction with the following drawings, in which.

DETAILED DESCRIPTION OF THE INVENTION

Figure 1:
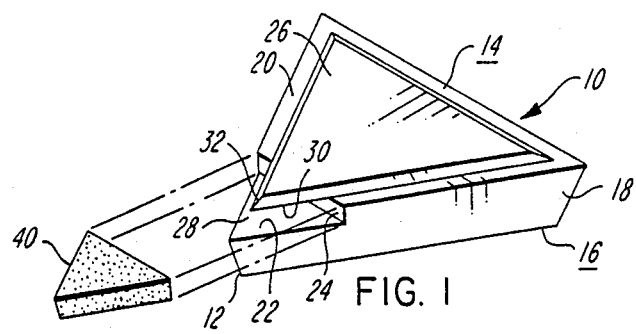
FIG. 1 is an exploded perspective view of the improved metalcutting insert of the present invention.

Turning now to FIG. 1, there is shown in perspective view, a metalcutting insert according to the present invention, having removed therefrom the polycrystalline diamond material or polycrystalline cubic boron nitride (CBN) material (hereinafter polycrystalline material) which forms the cutting edge of the insert. The insert generally indicated by the reference character 10 includes a forward end 12, an upper surface generally indicated at 14 and a bottom surface 16. A continuous side wall 18 extends between the bottom surface 16 and the upper surface 14. The upper surface 14 includes a first portion or rake face 20, a second portion or floor 22 and a third portion forming an integral chipbreaker means 26.

In certain styles of inserts, the upper surface first portion or rake face 20 can be generally parallel with the bottom surface 16 of the substrate. But in other embodiments or styles of inserts, the elevation of the upper surface first portion or rake face 20 relative to the bottom surface 16 varies. The rake face is the surface of the insert over which the chip flows. The rake face is inclined at an angle to the axis of the work piece and this angle can be adjusted to achieve optimum cutting performance for a given set of metal cutting conditions.

The second portion or floor 22 of the upper surface 14 is disposed at a second predetermined elevation relative to the bottom surface which elevation is less than the first elevation. The second portion is created during the manufacturing process described below and defines a floor onto which the advanced cutting material 40 is mounted.

The third portion 26 of the upper surface 14 of the substrate defines integral chipbreaking means disposed at a third elevation relative to the bottom surface 16 of the substrate. The third elevation is greater than the first elevation. It is to be appreciated that the specific geometry of the rake face and the chipbreaker may render an insert in which some portion of the chipbreaker is of a lessor elevation than the rake face.

In combination, the first, second and third portions of the upper surface form a means defining a slot 28. The slot 28 extends rearwardly from the forward end 12 of the substrate so that at least a portion of the integral chipbreaking means 26 extends over the slot means 28. Thus as can be seen in FIG. 1, the slot 28 comprises a bottom surface or floor 22, an upper surface 30 and a rear wall 24. The upper surface 30 is the underside of the integral chipbreaking member. The floor (the second portion 22) is generally parallel with the first portion rake face 20. Thus, the advanced metalcutting material 40 defines the cutting edge and at least the forward most portion of the rake face of the insert.

The polycrystalline cutting tool material, generally indicated by the reference character 40, can be divided into two basic families. The first is a polycrystalline diamond which is used for nonferrous applications. The second is the polycrystalline CBN (cubic boron nitride) which is used for hardened ferrous applications. The polycrystalline diamond material provides a cutting edge which consists of a polished synthetic polycrystalline diamond material. Its wear resistant cutting edge is chemically bonded to a carbide base for added durability. A randomly oriented crystalline structure makes this polycrystalline diamond material cutting edge superior in strength to a natural diamond and the carbide base facilitates the brazing of the polycrystalline diamond material to the insert 10. This material provides a sharp cutting edge that stays sharp longer even when machining nonferrous and abrasive materials. A fuller appreciation of such diamond material as well as metal cutting in general, is available in "Metal Cutting" by Edward Moor Trent, Butterworths (Publishers) Inc., the contents of which are incorporated herein by reference.

The polycrystalline CBN material is used for cutting tools which, while complementary, offer distinct advantages in certain types of hardened ferrous applications. The assignee of the present invention provides four grades of such material, each grade being specifically applicable to a particular metalcutting application.

Returning to FIG. 1, it can be seen that the slot 28 and the general shape of the forward portion 12 of the substrate is adapted to receive therein the polycrystalline cutting tool material 40 which is of a complementary configuration. In other words, as the shape of the substrate of the insert changes to reflect the style of that insert, whether it be triangle, diamond or rectangle, the shape of the polycrystalline cutting tool material is adapted to correspond therewith.

The substrate 10 is manufactured in a conventional process known in the art. After manufacture, the slot 28 is formed in the substrate through the use of a wire EDM, electrical discharge machining technique. The placement of the slot underneath the widow's peak 32 or forward portion of the chipbreaker 26 provides a unique advantage heretofore unavailable in the art. It should also be appreciated that many of the inserts illustrated herein are available in a variety of individual configurations such that the rake face of each insert may be of a different angle. These angles are taken into consideration during the formation of the insert substrate's slot. Now, rather than the use of a separate mechanical chipbreaker on the top of the insert, the chipbreaking member is integrally formed with the insert substrate. The precise location of the chipbreaker provides consistent chip formation characteristics and dependable metal cutting results. As indicated above, the polycrystalline cutting material 40 is configured so as to fit within the slot 28 to provide the cutting edge and at least a portion of the insert's rake face. The polycrystalline cutting material 40 is brazed in the slot. Because of the nature of the polycrystalline cutting material (as described above) the braze is formed adjacent the floor 22 and the back wall 24. The close tolerance between the bottom 30 of the chipbreaker 26 and the top of the polycrystalline cutting material 40 minimizes the possibility of metal chips becoming wedged therebetween during metal cutting operations. Final edge preparation of the cutting edge 40 is accomplished after the final brazing operation. Preferably, the polycrystalline material is manufactured in near net shape so that, when the diamond material is inserted into the slot, minimal final edge preparation and/or grinding is required.

FIGS. 2 through 8 show a variety of applications of the present invention in inserts of various configurations. In these several Figures, the insert is generally indicated by the reference character 110 and the polycrystalline metalcutting material is indicated by the reference character 140. The manufacturing technique for these several inserts is as described above, with the only difference in the inserts being their particular style and the manner by which the inserts are removably secured to a toolholder as described hereinafter.

Figure 2:
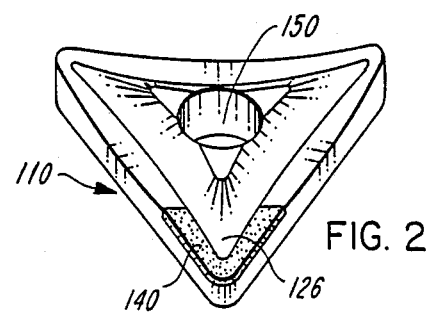
FIG. 2 is a perspective view of a triangle insert (Style TNMS) incorporating the features of the present invention.
Figure 3:
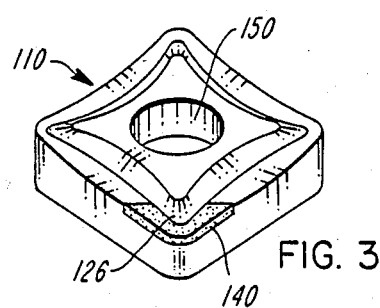
FIG. 3 is a perspective view of a rectangle insert (Style SNMS) incorporating the features of the present invention.
Figure 4:
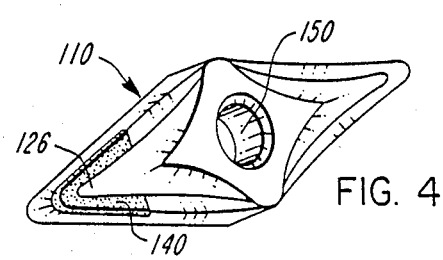
FIG. 4 is a perspective view of a diamond insert (Style VNMS) incorporating the improved features of the present invention.
Figure 5:
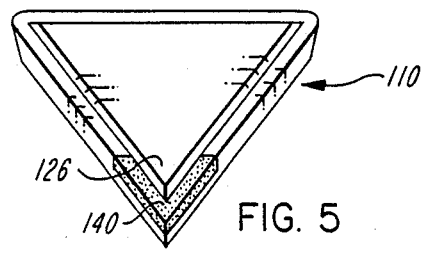
FIG. 5 is a perspective view of triangle insert (Style TPGF) incorporating the features of the present invention.
Figure 6:
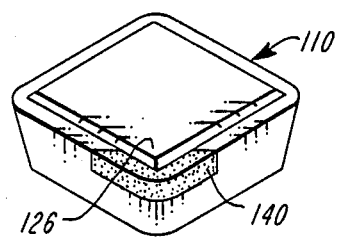
FIG. 6 is a perspective view of a rectangular insert (Style SPGF) incorporating the features of the present invention.
Figure 7:
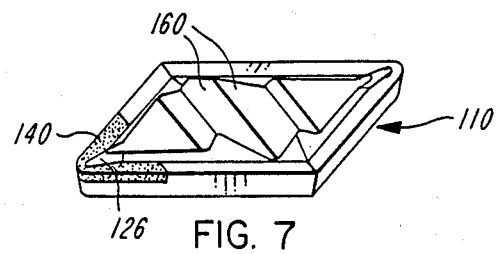
FIG. 7 is a perspective view of a profiling insert (Style NPGR: the entire designation is a Kennametal devised standard for a proprietary product and is a proprietary designation system of Kennametal Inc., the assignee of the subject invention) with integral chip control features incorporating the features of the present invention.
Figure 8:
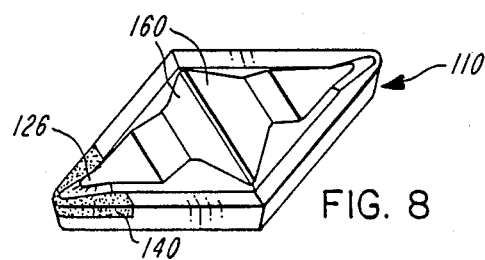
FIG. 8 is a perspective view of a diamond insert (Style DPGR) with chip control features incorporating the features of the present invention.

FIG. 2 shows the use of the polycrystalline material with a triangle metalcutting insert having integral chip control features. FIG. 3 shows the use of this invention with a rectangular insert with integral chip control features. It should be noted that both the inserts of FIGS. 2 and 3 have a centrally disposed hole 150 therein which can be used by a securing means for retaining the insert onto a toolholder. FIG. 4 shows a similarly configured diamond shaped insert with chip control features integral therewith.

FIGS. 5 through 8 show another embodiment of the present invention in which the metalcutting substrate does not include a hole therein for securing a metalcutting insert to a tool. Rather, the metalcutting insert is retained in the tool by a clamping mechanism which securely retains the insert within the tool. Additionally, the inserts of FIGS. 7 and 8 incorporate a pair of integral notches 160 which cooperate with a clamping arrangement such as that taught in U.S. Pat. No. 3,754,309 which is assigned to the assignee of the present invention and which is incorporated herein by reference. In all other respects, however, the inserts 110 shown in FIGS. 5 through 8 incorporate the integral chip control features 126 in combination with the polycrystalline and diamond material 140.

What has been described is an improved metalcutting tool which incorporates a polycrystalline diamond material in combination with a substrate having an integral chip control feature thereon. The advanced metalcutting material is mounted in the insert such that at least a portion of the integral chipbreaking means extends thereover. Both the geometry of the chipbreaking means and the rake face of the insert are maintained in a preferred configuration. With the improved insert of this invention, metalcutting capabilities are enhanced through the use of the advanced metal cutting materials and a consistent, integral chipbreaking capability is ensured while power consumption is conserved through the geometry of the rake face.

What is claimed is:

1. An improved metalcutting insert comprising a substrate defining a forward end, an upper surface, a bottom surface and means defining a substantially continuous side wall therebetween, said upper surface having a first portion, a second portion and a third portion, said first portion being of a predetermined first elevation relative to said bottom surface and defining a rake face, said second portion being at a second elevation relative to said bottom surface and defining a floor portion and said third portion being at a third elevation and defining chip breaking means integral with the remainder of said substrate; said first, second and third portions of said upper surface defining therein means forming a slot between said integral chip breaking means and floor portion, said slot extending rearwardly from said forward end; and means defining a cutting edge adapted to be mounted in said slot means, so that at least a portion of said cutting edge means forms said rake face and at least a portion of said integral chip breaking means extends over said cutting edge means.

2. The improved metalcutting insert according to claim 1 wherein the insert is a rectangular style insert with integral chip control features.

3. The improved metalcutting insert according to claim 1 wherein the insert is a diamond shaped insert with chip control features integral therewith.

4. The improved metalcutting insert according to claim 1 wherein the insert is a triangle shaped insert with chip control features integral therewith.

5. The improved metalcutting insert according to claim 1 wherein the insert is adapted to be retained in a tool by a clamping mechanism which securely retains the insert within the tool.

6. The improved metalcutting insert according to claim 1 wherein the insert has a centrally disposed hole for securing in a securing means for retaining the insert onto a toolholder.

7. The improved metalcutting insert according to claim 1 wherein the cutting edge means is a polycrystalline diamond material.

8. The improved metalcutting insert according to claim 1 wherein the cutting edge means is a polycrystalline cubic boric nitride material.

9. The improved metalcutting insert according to claim 1 wherein the substrate is a hard cemented carbide.

* * * * *

UNITED STATES PATENT AND TRADEMARK OFFICE
CERTIFICATE OF CORRECTION

PATENT NO. : 4,854,784
DATED : Aug. 8, 1989
INVENTOR(S) : Gerald D. Murray; Shelby R. Gibson; Keith J. Carpenter; Kenneth E. Carpenter; Michael R. Carpenter It is certified that error appears in the above—identified patent and that said Letters Patent is hereby corrected as shown below:

Cover Page, Item [73], after "Kennametal Inc., Latrobe, Pa." insert

---and Clapp & Haney Tool Company, Whitehouse, Oh.---.

Signed and Sealed this

Twenty-sixth Day of June, 1990

Attest:

HARRY F. MANBECK, JR.

*Attesting Officer*    *Commissioner of Patents and Trademarks*